United States Patent
Jacques et al.

(10) Patent No.: US 9,111,190 B2
(45) Date of Patent: Aug. 18, 2015

(54) SYSTEM FOR AND METHOD OF LOCATING RADIO FREQUENCY IDENTIFICATION (RFID) TAGS ASSOCIATED WITH ITEMS IN A CONTROLLED AREA

(71) Applicant: SYMBOL TECHNOLOGIES, INC., Holtsville, NY (US)

(72) Inventors: Alexander M. Jacques, Kings Park, NY (US); Benjamin J. Bekritsky, Modiin (IL); Michael J. Koch, Ft. Salonga, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 194 days.

(21) Appl. No.: 13/742,768

(22) Filed: Jan. 16, 2013

(65) Prior Publication Data
US 2014/0197928 A1  Jul. 17, 2014

(51) Int. Cl.
*H04Q 5/22* (2006.01)
*G08B 13/14* (2006.01)
(Continued)

(52) U.S. Cl.
CPC .............. *G06K 19/0723* (2013.01); *G01S 3/28* (2013.01); *G01S 13/751* (2013.01); *G01S 3/32* (2013.01); *G01S 3/74* (2013.01); *G01S 13/762* (2013.01); *G01S 2013/0245* (2013.01)

(58) Field of Classification Search
CPC . G01S 2013/0245; G01S 3/74; G01S 13/751; G01S 13/762; G01S 3/28; G01S 3/32; G01S 5/04; G01S 5/02; G01S 5/12; G01S 13/4445; G01S 13/75; G01S 13/4454; G01S 3/48; G06K 19/0723; G06K 7/10346; G06K 7/10336; G08B 13/2462; G08B 13/2471; H04B 7/0617; H04B 7/0842; H01Q 25/00; H01Q 21/205

USPC ............... 340/10.3, 572.1, 572.4, 572.7, 505, 340/539.11, 539.13, 5.7, 10.1, 10.41, 10.4; 455/277.1, 277.2, 562, 562.2, 61, 102; 342/374, 359, 462, 450, 154, 354; 235/375; 343/757

See application file for complete search history.

(56) References Cited

U.S. PATENT DOCUMENTS 5,859,610 A   1/1999   Lenormand et al.
7,602,293 B2  10/2009  Taki et al.
(Continued)

OTHER PUBLICATIONS

Toby Haynes, "A Primer on Digital Beamforming", Spectrum Signal Processing, Mar. 26, 1998; 15 pages.
International Search Report and Written Opinion mailed Apr. 4, 2014 in counterpart PCT application No. PCT/US2014/011411.

*Primary Examiner* — Mirza Alam

(57) ABSTRACT

A radio frequency identification (RFID) tag reading system having a phased antenna array accurately locates RFID tags in a controlled area, by steering an interrogating beam over the controlled area to interrogate the tags and generate return modulated RF signals. A primary receiver steers a primary receive beam at a primary steering angle that is fixed during each tag interrogation. A primary demodulator demodulates and reconstructs the received return modulated signals. A secondary receiver, independently of the primary receiver, steers a secondary receive beam at a plurality of secondary steering angles. A secondary correlator/demodulator demodulates the combined return modulated signals, and utilizes the reconstructed signal reconstructed by the primary demodulator at each of the secondary steering angles. Both the primary and the secondary receivers cooperate to accurately locate the same tag.

17 Claims, 5 Drawing Sheets

(51) Int. Cl.
*G01S 3/02* (2006.01)
*G01S 13/00* (2006.01)
*H01Q 3/00* (2006.01)
*G06K 19/07* (2006.01)
*G01S 3/28* (2006.01)
*G01S 13/75* (2006.01)
*G01S 3/32* (2006.01)
*G01S 3/74* (2006.01)
*G01S 13/76* (2006.01)
*G01S 13/02* (2006.01)

(56) References Cited

U.S. PATENT DOCUMENTS

| | | | |
|---|---|---|---|
| 2005/0110641 A1* | 5/2005 | Mendolia et al. | 340/572.7 |
| 2005/0280508 A1 | 12/2005 | Mravca et al. | |
| 2007/0080787 A1* | 4/2007 | Taki et al. | 340/10.1 |
| 2009/0002165 A1* | 1/2009 | Tuttle | 340/572.1 |
| 2010/0039228 A1* | 2/2010 | Sadr et al. | 340/10.1 |
| 2010/0151810 A1 | 6/2010 | Besoli et al. | |
| 2010/0207738 A1 | 8/2010 | Bloy et al. | |
| 2010/0225480 A1 | 9/2010 | Bloy et al. | |
| 2011/0169613 A1* | 7/2011 | Chen et al. | 340/10.4 |

\* cited by examiner

SYSTEM FOR AND METHOD OF LOCATING RADIO FREQUENCY IDENTIFICATION (RFID) TAGS ASSOCIATED WITH ITEMS IN A CONTROLLED AREA

FIELD OF THE DISCLOSURE

The present disclosure relates generally to a system for, and a method of, locating radio frequency identification (RFID) tags associated with items in a controlled area, especially for inventory control of the RFID-tagged items, by using a phased antenna array for better radio frequency coverage, and, more particularly, to more accurately and more rapidly locate the RFID-tagged items.

BACKGROUND

Radio frequency identification (RFID) technology is becoming increasingly important for logistics concerns, material handling and inventory management in retail stores, warehouses, distribution centers, buildings, and like controlled areas. An RFID system typically includes at least one RFID reader, also known as an RFID interrogator, and an RFID tag that is usually attached to, or associated with, an individual item, or to a package for the item. The RFID reader interrogates one or more RFID tags in its coverage range by transmitting a radio frequency (RF) interrogating signal, and the RFID tag, which senses the interrogating RF signal, responds by transmitting a return RF signal. The RFID tag either generates the return RF signal originally, or reflects back a portion of the interrogating RF signal in a process known as backscatter. The return RF signal may further encode data stored internally in the tag. The return signal is demodulated and decoded into data by the reader, which thereby identifies, counts, or otherwise interacts with the associated item. The decoded data can denote a serial number, a price, a date, a destination, other attribute(s), or any combination of attributes, and so on.

The RFID tag typically includes an antenna, a power management section, a radio section, and frequently a logic section, a memory, or both. In earlier RFID tags, the power management section included an energy storage device, such as a battery. An RFID tag with an active transmitter is known as an active tag. An RFID tag with a passive transmitter is known as a passive tag and backscatters. Advances in semiconductor technology have miniaturized the electronics so much that an RFID tag can be powered solely by the RF signal it receives. An RFID tag that backscatters and is powered by an on-board battery is known as a semi-passive tag.

The RFID system is often used in an inventory monitoring application. For example, in order to take inventory of RFID-tagged items in a retail store, it is known to position at least one RFID reader in a controlled area, and then, to allow each reader to automatically read whatever tagged items are in the coverage range of each reader. For superior RF coverage, it is known to provide each reader with a phased antenna array that generates an interrogating beam that is electronically steered both in azimuth, e.g., over an angle of 360 degrees, and in elevation, e.g., over an angle of about 90 degrees.

As advantageous as such known inventory-taking RFID systems utilizing phased antenna arrays have been, it has proven difficult in practice to very accurately and rapidly locate a particular tag. There is a practical limit on the number of antennas that can be used in the array. This antenna limit causes the interrogating beam to have a relatively broad beam width. The interrogating beam is typically steered to a steering angle at which the reader reads the tag with the highest or peak receive signal strength (RSS). However, determining the location, i.e., the azimuth and the elevation, of a tag based on the peak RSS of the interrogating beam is imprecise due to the relatively broad beam width of the interrogating beam.

Rather than relying on the peak RSS, it has been suggested in other, non-RFID, phased array applications to steer a beam by null steering techniques. Nulls are generally "sharper", i.e., vary more over a given steering angle, as compared to peak RSS steering for most antenna radiation patterns. Hence, a null does not suffer from the drawback of a broad beam width. However, null steering techniques are not very useful for RFID readers, since the tag must be irradiated with a certain minimum strength interrogating RF signal in order to power the tag and enable it to be read. Additionally, a certain minimum strength return RF signal is needed to demodulate the tag. An RFID tag will not be detectable in a null.

Accordingly, there is a need to more accurately locate RFID tags despite the practical limit on the number of antennas that can be used in a phased antenna array.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
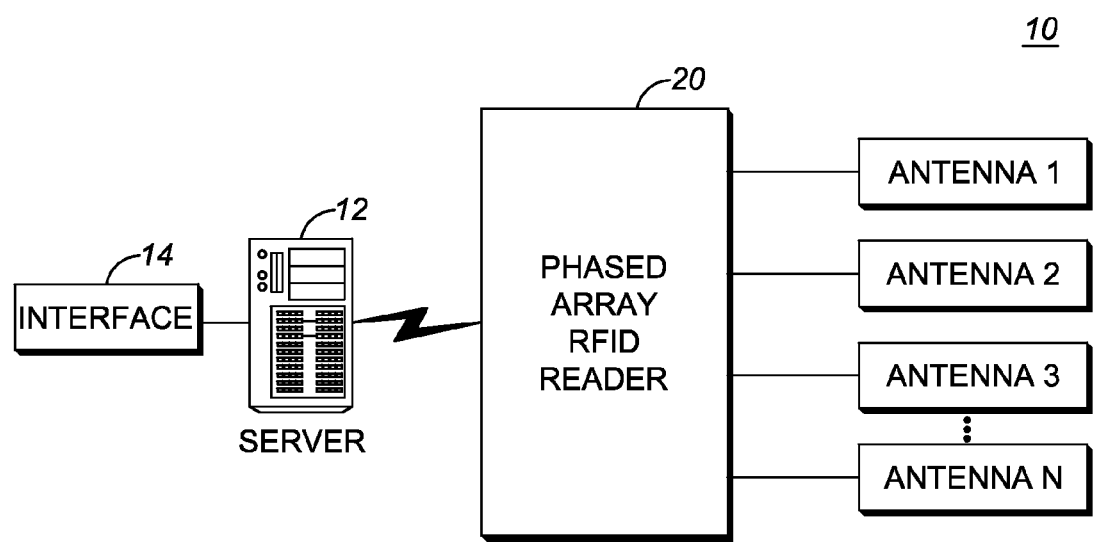
FIG. 1 is a schematic view of an exemplary radio frequency identification (RFID) tag reading system having a phased array of antennas in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a radio frequency (RF) identification (RFID) tag reading system for accurately locating RFID tags associated with items in a controlled area. The controlled area may be a retail store, a warehouse, or any other confined or open area in which RFID-tagged items are to be monitored. The system includes a phased antenna array, an RF transmitter, a primary RF receiver, and at least one secondary RF receiver, and preferably a plurality of secondary RF receivers.

The RF transmitter is operative for steering an interrogating (transmit) beam over the controlled area to interrogate the tags and generate return modulated RF signals from the tags. The primary RF receiver is operative for steering a primary receive beam over the controlled area at a primary steering angle that is fixed during each tag interrogation. The steering of the interrogating beam and of the primary receive beam may be performed sequentially or simultaneously. The RF transmitter is operative for transmitting an RF interrogating signal over the phased antenna array to generate the interrogating beam. Advantageously, the RF transmitter includes a transmit beam steering unit that has a plurality of complex multipliers, and a plurality of programmable devices that set a complex coefficient for each complex multiplier to effect baseband steering of the interrogating beam.

The primary RF receiver is operative for detecting the tags by receiving and combining the return modulated RF signals as the primary receive beam over the phased antenna array. Advantageously, the primary RF receiver includes a primary receive beam steering unit that has a plurality of complex multipliers, and a plurality of programmable devices that set a complex coefficient for each complex multiplier to effect baseband steering of the primary receive beam. It is often the case that the transmit beam steering unit and the primary receive beam steering unit function to steer the interrogating beam and the primary receive beam to the same azimuth and elevation angle. The primary RF receiver also includes a primary demodulator for demodulating the combined return modulated RF signals from the primary RF receiver to detect each tag, for reconstructing the received return modulated RF signal for each tag, and for measuring a primary received signal strength for each tag. Advantageously, the primary beam steering unit includes a primary complex adder coupled to the complex multipliers of the primary RF receiver to generate a combined primary output modulated RF signal for input to the primary demodulator.

Each secondary RF receiver is operative, independently of the primary RF receiver, for steering a secondary receive beam over the controlled area at a plurality of secondary steering angles, and for receiving and combining the return modulated RF signals as the secondary receive beam over the phased antenna array. Advantageously, each secondary RF receiver includes a secondary receive beam steering unit that has a plurality of complex multipliers, and a plurality of programmable devices that set a complex coefficient for each complex multiplier to effect baseband steering of each secondary receive beam. Each secondary RF receiver includes a secondary correlator/demodulator for demodulating the combined return modulated RF signals from each secondary RF receiver, and for measuring a secondary received signal strength utilizing the reconstructed tag signal reconstructed by the primary demodulator at each of the secondary steering angles. Advantageously, each secondary beam steering unit includes a secondary complex adder coupled to the complex multipliers of each secondary RF receiver to generate a combined secondary output modulated RF signal for input to each secondary correlator/demodulator.

Preferably, a plurality of transmit/receive modules are operatively connected between the phased antenna array and the RF transmitter and the primary and the secondary RF receivers, for converting the baseband steering to passband steering. The primary demodulator is advantageously operative for reconstructing the received return modulated RF signal, and for measuring the received signal strength for each tag, and for measuring at least one receive parameter that includes a backscatter link frequency and/or a reception time. Each secondary RF receiver is operative for changing or cycling among the secondary steering angles during a tag interrogation, and is operative for steering each secondary receive beam, e.g., by null steering or another steering technique. In null steering, the secondary steering angle that generates the lowest receive signal strength on a respective secondary RF receiver is the bearing angle where the location of the tag is estimated.

Thus, the primary RF receiver is used to detect and demodulate tags by conventional primary beam steering, i.e., by sweeping the primary receive beam at a primary steering angle that is fixed during each tag interrogation. The fixed steering angle ensures a sufficiently high received signal strength (RSS) sufficient for demodulation. Yet, as described above, due to the practical limit on the number of antennas in the array and the concomitant relatively broad interrogating beam width, the locating of the tags, just by relying on the primary RF receiver, is imprecise.

Hence, in accordance with the present disclosure, at least one secondary RF receiver is used in cooperation with the primary RF receiver to assist in more accurately locating each tag. The primary RF receiver reconstructs the return RF signal for each tag, and the secondary RF receiver utilizes the reconstructed return RF signal for each tag in order to ensure that the same tag is being read by the primary and the secondary RF receivers. By correlating the reconstructed return RF signal with the secondary RF receiver, it is no longer so critical whether the RSS of the return RF signal detected by the secondary RF receiver may be too low be accurately detected and demodulated by other methods. This is particularly important when null steering the secondary receive beam, as the RSS at the null is, as described above, quite low.

The steering beam angles for the secondary RF receiver may be changed during the course of a tag transmission in order to quickly measure the RSS at each different steering beam angle. This greatly reduces the time required to measure the RSS at different steering beam angles, as compared to having a single RF receiver that can only change steering beam angles between tag transmissions, and which therefore requires several transmissions from the same tag to measure the RSS at the different steering beam angles.

A method, in accordance with another aspect of this disclosure, relates to a radio frequency (RF) identification (RFID) tag reading method of accurately locating RFID tags associated with items in a controlled area. The method is performed by steering an interrogating beam over the controlled area to interrogate the tags and generate return modulated RF signals from the tags, by steering a primary receive beam over the controlled area at a primary steering angle that is fixed during each tag interrogation, by transmitting an RF interrogating signal with an RF transmitter over a phased antenna array to generate the interrogating beam, by detecting the tags with a primary RF receiver by receiving and combining the return modulated RF signals as the primary receive beam over the phased antenna array, by demodulating the combined return modulated RF signals from the primary RF receiver to detect each tag, by reconstructing the received return modulated RF signal for each tag, by measuring a primary received signal strength for each tag, by operating a secondary RF receiver, independently of the primary RF receiver, to steer a secondary receive beam over the controlled area at a plurality of secondary steering angles, and to receive and combine the return modulated RF signals as the secondary receive beam over the phased antenna array, by demodulating the combined return modulated RF signals from the secondary RF receiver, and by measuring a secondary received signal strength utilizing the reconstructed tag signal at each of the secondary steering angles, whereby both the primary and the secondary RF receivers cooperate to accurately locate the same tag even if the secondary received signal strength is below a threshold value.

Figure 2:
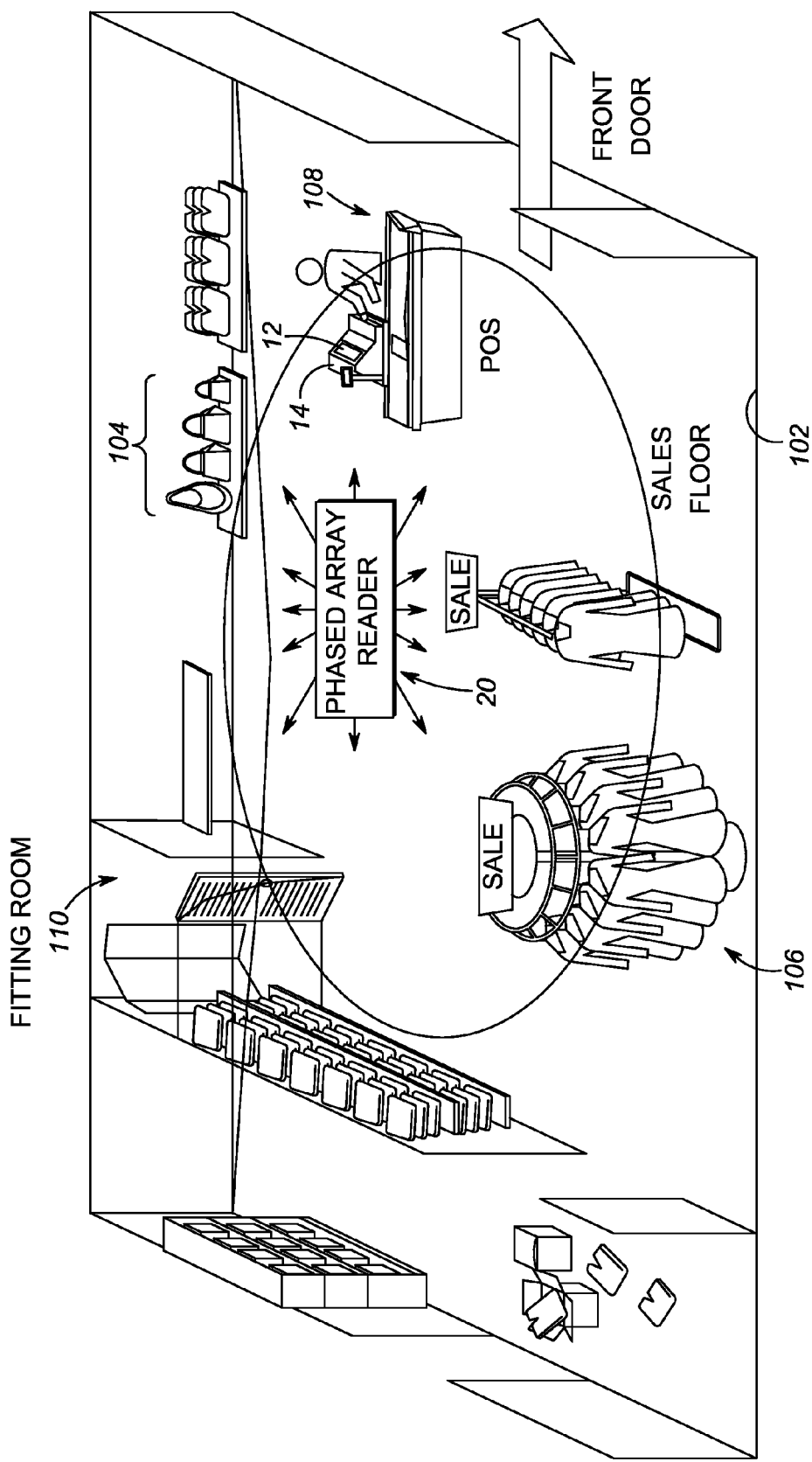
FIG. 2 is a perspective, schematic view of the system of FIG. 1 installed in an exemplary controlled area, especially for inventory control of RFID-tagged items.

Turning now to the drawings, FIG. 1 depicts a simplified depiction of a radio frequency identification (RFID) tag reading system 10 for accurately locating RFID tags associated with items to be tracked or monitored. The system 10 has a phased array RFID reader 20 connected to a plurality of antennas 1, 2, 3 . . . , N. The RFID reader 20 is also connected to a server or controller 12 and a user interface 14. FIG. 2 depicts an exemplary depiction of the RFID reader 20 deployed in a controlled area 102 of a retail sales floor having a point-of-sale (POS) station 108 at which the controller 12 and the interface 14 may be provided, a fitting room 110, and a plurality of RFID-tagged items, e.g., clothes 106, handbags 104, etc., arranged on shelves, hangers, racks, on the floor, etc. in the controlled area 102. Each RFID-tagged item 104, 106 is preferably associated with a passive RFID tag for cost reasons. To simplify the drawing, only one reader 20 has been illustrated, and the reader 20 has been illustrated as being preferably located overhead on the ceiling in the controlled area 102. More or less than one reader 20 could be deployed, and not necessarily on the ceiling. Each reader 20 may be powered from an electrical outlet, powered over the Ethernet (POE), or can be battery powered.

The controller 12 comprises one or more computers or servers and is in wired, wireless, direct, or networked communication with the interface 14 and with the reader 20. The interface 14 provides a human/machine interface, e.g., a graphical user interface (GUI), that presents information in pictorial and/or textual form (e.g., representations of locations of the RFID-tagged items 104, 106) to a human user, and to initiate and/or alter the execution of various processes that may be performed by the controller 12, and to control the operation of the components of the reader 20, as described below. The controller 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the controller 12 may be a computer, either located at a controlled area 102 (see FIG. 2) containing the RFID-tagged items 104, 106, or remotely at some other location, or can be hosted in a cloud server. The controller 12 advantageously includes a wireless RF transceiver that communicates with the reader 20. For example, Wi-Fi and Bluetooth® are open wireless standards for exchanging data between electronic devices.

Figure 3:
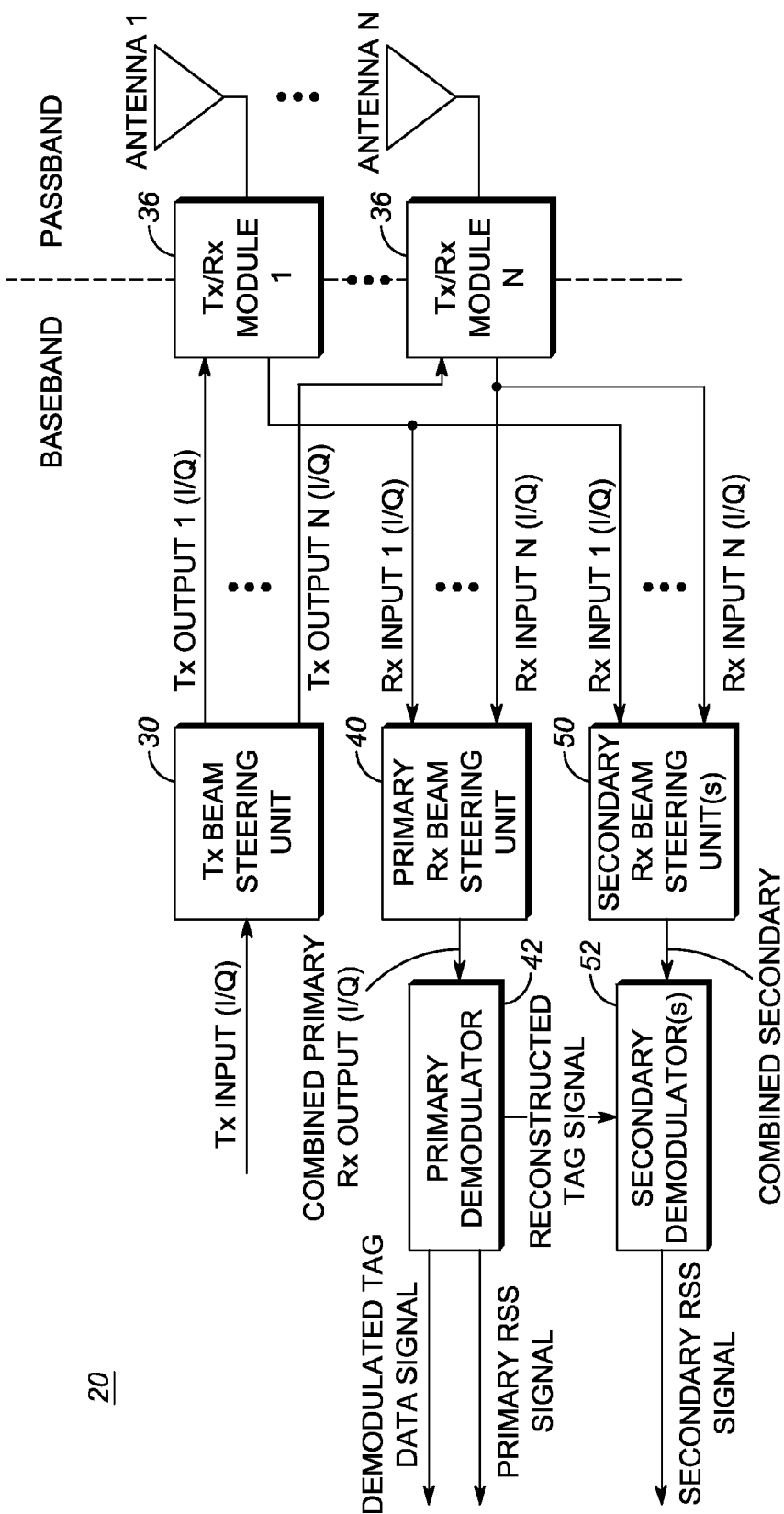
FIG. 3 is a block diagram depicting components of the overall system of FIG. 1.
Figure 4:
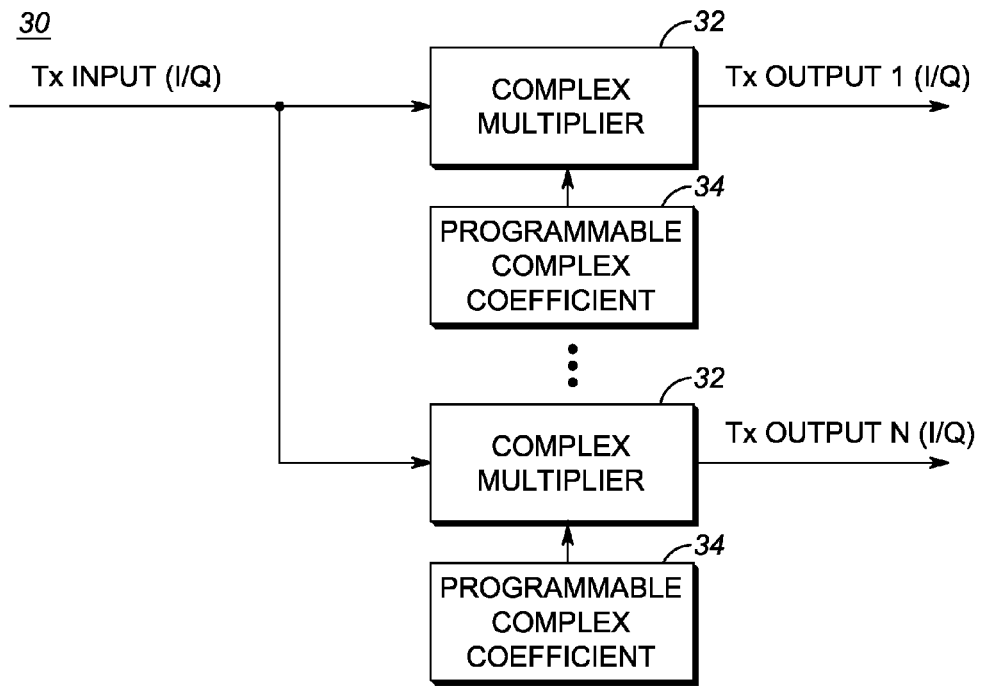
FIG. 4 is a block diagram depicting components of the transmit beam steering unit depicted in FIG. 3.

Turning now to FIG. 3, the RFID reader 20 includes an RF transmitter that has a transmit (Tx) beam steering unit 30 operative for steering an interrogating (transmit) beam over the controlled area 102 to interrogate the tags and generate return modulated RF signals from the tags, and for transmitting an RF interrogating signal over the phased array antennas to generate the interrogating beam. As shown in FIG. 4, the transmit (Tx) beam steering unit 30 has a plurality of complex multipliers 32, and a corresponding plurality of programmable devices 34 that set a complex coefficient for each complex multiplier 32 to effect baseband steering of the interrogating beam. A transmit (Tx) input signal having quadrature baseband I and Q components is output from a microprocessor and is conducted to each complex multiplier 32, and a corresponding plurality of transmit (Tx) output signals Tx Output 1 . . . Tx Output N having quadrature baseband I and Q components is conducted from each complex multiplier 32. The baseband steering of the interrogating beam by setting a complex coefficient for each complex multiplier 32 is known in the art, and details thereof can be obtained, for example, by reference to "A Primer on Digital Beamforming", by Toby Haynes, in Spectrum Signal Processing, Mar. 26, 1998, the entire contents of said primer being incorporated herein by reference thereto.

A plurality of transmit/receive (Tx/Rx) modules 36 are operatively connected between the phased antenna array and the RF transmitter for converting the baseband steering to passband steering. Each transmit (Tx) output signal Tx Output 1 . . . Tx Output N is conducted to a respective Tx/Rx module 36. The output of each Tx/Rx module 36 is connected to a respective antenna.

Figure 5:
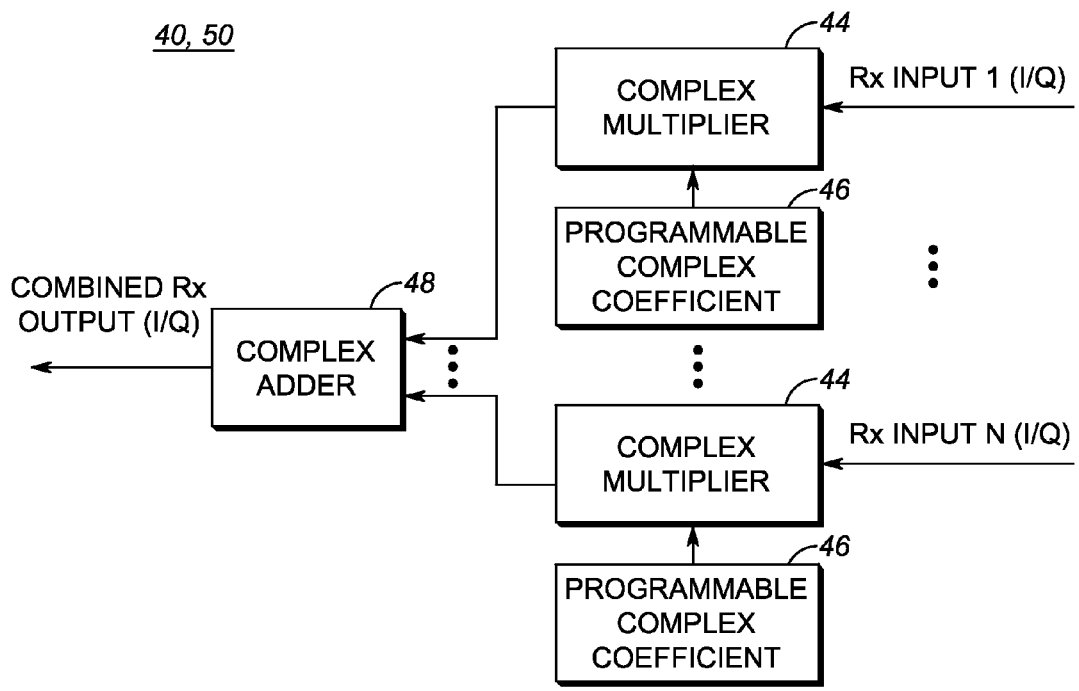
FIG. 5 is a block diagram depicting components of the primary or the secondary receive beam steering unit depicted in FIG. 3.

The RFID reader 20 also includes a primary RF receiver that includes a primary receive (Rx) beam steering unit 40 and a primary demodulator 42. The primary receive (Rx) beam steering unit 40 is operative for steering a primary receive beam over the controlled area 102 at a primary steering angle that is fixed during each tag interrogation, and for detecting the tags by receiving and combining the return modulated RF signals as the primary receive beam over the phased antenna array. As shown in FIG. 5, the primary receive beam steering unit 40 has a plurality of complex multipliers 44, a plurality of programmable devices 46 that set a complex coefficient for each complex multiplier 44 to effect baseband steering of the primary receive beam, and a primary complex adder 48 coupled to the complex multipliers 44 of the primary RF receiver to generate a combined primary output modulated RF signal. A plurality of receive (Rx) input signals Rx Input 1 . . . Rx Input N having quadrature baseband I and Q components is conducted from the Tx/Rx modules 36 to each complex multiplier 44 of the primary Rx beam steering unit 40, and a combined Primary Rx Output signal having quadrature baseband I and Q components is conducted from the primary complex adder 48 to the primary demodulator 42. The baseband steering of the primary receive beam by setting a complex coefficient for each complex multiplier 44 is known in the art, and details thereof can be obtained, for example, by reference to the above-identified primer.

As shown in FIG. 3, the primary demodulator 42 is operative for demodulating the combined return modulated RF signals from the primary RF receiver to generate a Demodulated Tag Data signal that detects each tag, for reconstructing the received return modulated RF signal for each tag by generating a Reconstructed Tag Signal, and for measuring a primary received signal strength (Primary RSS) signal for each tag. The Demodulated Tag Data signal and the Primary RSS signal are conducted to the aforementioned microprocessor.

The RFID reader 20 also includes at least one secondary RF receiver, and preferably a plurality of secondary RF receivers, each secondary RF receiver having a secondary receive (Rx) beam steering unit 50 and a secondary correlator/demodulator 52. Each secondary receive (Rx) beam steering unit 50 is operative, independently of the primary RF receiver, for steering a secondary receive beam over the controlled area 102 at a plurality of secondary steering angles, and for receiving and combining the return modulated RF signals as the secondary receive beam over the phased antenna array. Each secondary RF receiver has a plurality of complex multipliers (just like the complex multipliers 44 of FIG. 5), a plurality of programmable devices (just like the programmable devices 46 of FIG. 5) that set a complex coefficient for each complex multiplier to effect baseband steering of each secondary receive beam, and a complex secondary complex adder (just like the complex adder 48 of FIG. 5) coupled to the complex multipliers of each secondary RF receiver to generate a combined secondary output modulated RF signal. FIG. 5 thus is generic for the primary Rx beam steering unit 40 and for the secondary Rx beam steering unit 50.

The aforementioned plurality of receive (Rx) input signals Rx Input 1 . . . Rx Input N having quadrature baseband I and Q components is conducted from the Tx/Rx modules 36 to each complex multiplier of the secondary Rx beam steering unit 50, and a combined Secondary Rx Output signal having quadrature baseband I and Q components is conducted from the secondary complex adder to the secondary correlator/demodulator 52. The baseband steering of the secondary receive beam by setting a complex coefficient for each complex multiplier is known in the art, and details thereof can be obtained, for example, by reference to the above-identified primer.

As shown in FIG. 3, the secondary correlator/demodulator 52 is operative for demodulating the combined return modulated RF signals from each secondary RF receiver, and for generating a Secondary RSS signal by measuring a secondary RSS utilizing the Reconstructed Tag signal reconstructed by the primary demodulator 42 at each of the secondary steering angles. Thus, the secondary correlator/demodulator 52 is operative for correlating the Reconstructed Tag signal. The Secondary RSS signal is conducted to the aforementioned microprocessor.

The primary demodulator 42 reconstructs the received return modulated RF signal, measures the received signal strength for each tag, and measures at least one receive parameter that includes a backscatter link frequency and/or a reception time. Each secondary RF receiver is operative for changing or cycling among the secondary steering angles during a tag interrogation, and is operative for steering each secondary receive beam, e.g., by null steering or some other steering technique. In null steering, the secondary steering angle that generates the lowest receive signal strength on a respective secondary RF receiver is the bearing angle where the location of the tag is estimated.

Thus, the primary RF receiver is used to detect and demodulate tags by conventional primary beam steering, i.e., by sweeping the primary receive beam at a primary steering angle that is fixed during each tag interrogation. The fixed steering angle ensures a sufficiently high received signal strength (RSS) sufficient for demodulation. Yet, as described above, due to the practical limit on the number of antennas in the array and the concomitant relatively broad interrogating beam width, the locating of the tags, just by relying on the primary RF receiver, is imprecise.

Hence, in accordance with the present disclosure, at least one secondary RF receiver is used in cooperation with the primary RF receiver to assist in more accurately locating each tag. The primary RF receiver reconstructs the return RF signal for each tag, and the secondary RF receiver utilizes the reconstructed return RF signal for each tag in order to ensure that the same tag is being read by the primary and the secondary RF receivers. By correlating the reconstructed return RF signal with the secondary RF receiver, it is no longer so critical whether the RSS of the return RF signal detected by the secondary RF receiver may be too low be accurately detected and demodulated by other methods. This is particularly important when null steering the secondary receive beam, as the RSS at the null is, as described above, quite low.

The steering beam angles for the secondary RF receiver may be changed during the course of a tag transmission in order to quickly measure the RSS at each different steering beam angle. This greatly reduces the time required to measure the RSS at different steering beam angles, as compared to having a single RF receiver that can only change steering beam angles between tag transmissions, and which therefore requires several transmissions from the same tag to measure the RSS at the different steering beam angles.

The controller 12 is operative for controlling operation of the aforementioned components, and for steering the various beams both in azimuth over an angular range of 360 degrees, and in elevation over an angular spread of about 90 degrees. The steering of the interrogating beam and of the primary receive beam and of each secondary receive beam may be performed sequentially or simultaneously. The aforementioned microprocessor may be internal to the reader 20, or may be external of the reader 20 and be implemented as the controller 12.

Figure 6:
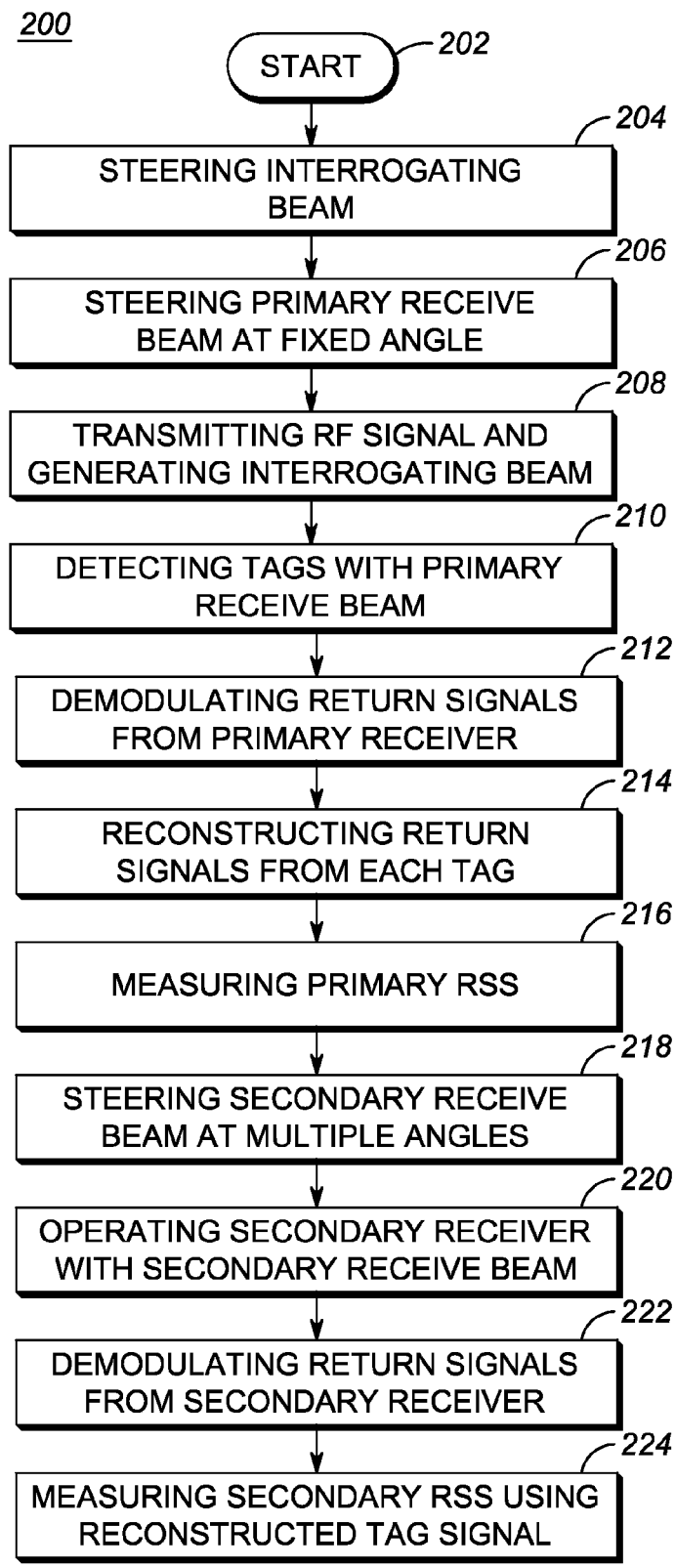
FIG. 6 is a flow chart depicting steps performed in accordance with a method of accurately locating tags associated with items in the controlled area in accordance with the present disclosure.

As described above, and as shown in the flow chart 200 of FIG. 6, beginning at start step 202, the RFID system 10 accurately locates RFID tags associated with items 104, 106 in a controlled area 102 by steering an interrogating beam over the controlled area to interrogate the tags and generate return modulated RF signals from the tags (step 204), by steering a primary receive beam over the controlled area at a primary steering angle that is fixed during each tag interrogation (step 206), by transmitting an RF interrogating signal with an RF transmitter over a phased antenna array to generate the interrogating beam (step 208), by detecting the tags with a primary RF receiver by receiving and combining the return modulated RF signals as the primary receive beam over the phased antenna array (step 210), by demodulating the combined return modulated RF signals from the primary RF receiver to detect each tag (step 212), by reconstructing the received return modulated RF signal for each tag (step 214), by measuring a primary received signal strength for each tag (step 216), by steering a secondary receive beam over the controlled area at a plurality of secondary steering angles (step 218), by operating a secondary RF receiver, independently of the primary RF receiver, to receive and combine the return modulated RF signals as the secondary receive beam over the phased antenna array (step 220), and by demodulating the combined return modulated RF signals from the secondary RF receiver (step 222), and by measuring a secondary received signal strength utilizing the reconstructed tag signal at each of the secondary steering angles (step 224), whereby both the primary and the secondary RF receivers cooperate to accurately locate the same tag even if the secondary received signal strength is below a threshold value.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, baseband beam steering is described, but all passband steering could be employed. The total number of the Tx/Rx modules 36 need not correspond in equal number to the total number of antennas; for example, a switching matrix can be used to reduce the number of the Tx/Rx modules 36. Null steering is described for the steering of the secondary receive beam, but other steering techniques, such as searching for the peak RSS could be employed.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for accurately locating RFID tags associated with items in a controlled area, comprising:
   a phased antenna array;
   an RF transmitter for steering an interrogating beam over the controlled area to interrogate the tags and generate return modulated RF signals from the tags by transmitting an RF interrogating signal over the phased antenna array to generate the interrogating beam;
   a primary RF receiver for steering a primary receive beam over the controlled area at a primary steering angle that is fixed during each tag interrogation, and for detecting the tags by receiving and combining the return modulated RF signals as the primary receive beam over the phased antenna array, the primary RF receiver including a primary demodulator for demodulating combined return modulated RF signals from the primary RF receiver to detect each tag, for reconstructing received return modulated RF signal for each tag, and for measuring a primary received signal strength for each tag; and
   a secondary RF receiver operative, independently of the primary RF receiver, for steering a secondary receive beam over the controlled area at a plurality of secondary steering angles by receiving and combining the return modulated RF signals as the secondary receive beam over the phased antenna array, the secondary RF receiver including a secondary demodulator for demodulating combined return modulated RF signals from the secondary RF receiver to generate a demodulated RF signal from the secondary RF receiver, and for measuring a secondary received signal strength utilizing both the demodulated RF signal from the secondary RF receiver and reconstructed tag signal reconstructed by the primary demodulator at each of the secondary steering angles, whereby both the primary and the secondary RF receivers cooperate to accurately locate same tag even if the secondary received signal strength is below a threshold value.

2. The system of claim 1, wherein the RF transmitter includes a transmit beam steering unit operative for baseband steering the interrogating beam, and wherein the primary RF receiver includes a primary beam steering unit operative for baseband steering the primary receive beam, and wherein the secondary receiver includes a secondary beam steering unit operative for baseband steering the secondary receive beam; and further comprising a plurality of transmit/receive modules operatively connected between the phased antenna array and the RF transmitter and the primary and the secondary RF receivers, for converting the baseband steering to passband steering.

3. The system of claim 2, wherein each beam steering unit includes a plurality of complex multipliers, and a plurality of programmable devices that set a complex coefficient for each complex multiplier to effect steering.

4. The system of claim 3, wherein the beam steering unit of the primary RF receiver includes a primary complex adder coupled to the complex multipliers of the primary RF receiver to generate a combined primary output modulated RF signal for input to the primary demodulator, and wherein the beam steering unit of the secondary RF receiver includes a secondary complex adder coupled to the complex multipliers of the secondary RF receiver to generate a combined secondary output modulated RF signal for input to the secondary demodulator.

5. The system of claim 1, wherein the primary demodulator is operative for reconstructing the received return modulated RF signal, for measuring received signal strength for each tag, and for measuring at least one receive parameter that includes at least one of a backscatter link frequency and a reception time.

6. The system of claim 1, wherein the secondary RF receiver is operative for changing among the secondary steering angles during a tag interrogation.

7. The system of claim 1, comprising another secondary RF receiver identical to first-mentioned secondary RF receiver, and wherein the primary RF receiver and both secondary RF receivers cooperate to accurately locate the same tag.

8. The system of claim 1, wherein the secondary RF receiver is operative for steering the secondary receive beam by null steering.

9. The system of claim 1, wherein a microprocessor for controlling operation of the RF transmitter, the primary RF receiver, and the secondary RF receiver.

10. A radio frequency (RF) identification (RFID) tag reading method of accurately locating RFID tags associated with items in a controlled area, comprising:
steering an interrogating beam over the controlled area to interrogate the tags and generate return modulated RF signals from the tags;
steering a primary receive beam over the controlled area at a primary steering angle that is fixed during each tag interrogation;
transmitting an RF interrogating signal with an RF transmitter over a phased antenna array to generate the interrogating beam;
detecting the tags with a primary RF receiver by receiving and combining the return modulated RF signals as the primary receive beam over the phased antenna array;
demodulating combined return modulated RF signals from the primary RF receiver to detect each tag, reconstructing received return modulated RF signal from the primary RF receiver for each tag, and measuring a primary received signal strength for each tag;
operating a secondary RF receiver, independently of the primary RF receiver, to steer a secondary receive beam over the controlled area at a plurality of secondary steering angles, and to receive and combine the return modulated RF signals as the secondary receive beam over the phased antenna array; and
demodulating the combined return modulated RF signals from the secondary RF receiver to generate a demodulated RF signal from the secondary RF receiver, and measuring a secondary received signal strength utilizing both the demodulated RF signal from the secondary RF receiver and reconstructed tag signal from the primary RF receiver at each of the secondary steering angles, whereby both the primary and the secondary RF receivers cooperate to accurately locate same tag even if the secondary received signal strength is below a threshold value.

11. The method of claim 10, wherein the interrogating beam, the primary receive beam and the secondary receive beam are steered by baseband steering; and further comprising converting the baseband steering to passband steering.

12. The method of claim 10, wherein baseband steering is performed by setting complex coefficients.

13. The method of claim 10, wherein measuring received signal strength for each tag, and measuring at least one receive parameter that includes at least one of a backscatter link frequency and a reception time.

14. The method of claim 10, wherein changing the secondary steering angles during a tag interrogation.

15. The method of claim 10, wherein providing another secondary RF receiver identical to first-mentioned secondary RF receiver, and wherein the primary RF receiver and both secondary RF receivers cooperate to accurately locate the same tag.

16. The method of claim 10, wherein the steering of the secondary receive beam is performed by null steering.

17. The method of claim 10, wherein controlling operation of the RF transmitter, the primary RF receiver, and the secondary RF receiver with a microprocessor.

* * * * *